United States Patent
Tzeng et al.

(10) Patent No.: US 6,678,276 B1
(45) Date of Patent: Jan. 13, 2004

(54) APPARATUS AND METHOD FOR SPECIFYING SUCCESSIVE BYTE LOCATIONS FOR EVALUATING DATA PACKETS IN A NETWORK SWITCH PORT

(75) Inventors: Shr-Jie Tzeng, Fremont, CA (US); Peter Ka-Fai Chow, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 796 days.

(21) Appl. No.: 09/594,608

(22) Filed: Jun. 15, 2000

(51) Int. Cl.[7] .............................................. H04L 12/56
(52) U.S. Cl. .................... 370/395.7; 370/423
(58) Field of Search ................. 370/389, 392, 370/393, 422, 423, 424, 426, 429, 469, 472, 395.2, 395.31, 395.32, 395.7, 395.71, 395.72

(56) References Cited

U.S. PATENT DOCUMENTS

| | | | |
|---|---|---|---|
| 5,386,413 A | * | 1/1995 | McAuley et al. ............ 370/392 |
| 5,920,900 A | * | 7/1999 | Poole et al. ................. 711/216 |
| 5,953,335 A | | 9/1999 | Erimli et al. |
| 6,438,145 B1 | * | 8/2002 | Movshovich et al. ........ 370/536 |

* cited by examiner

*Primary Examiner*—Kwang Bin Yao
(74) *Attorney, Agent, or Firm*—Manelli Denison & Selter PLLC; Leon R. Turkevich

(57) ABSTRACT

A network switch, configured for performing layer 2 and layer 3 switching in an Ethernet (IEEE 802.3) network without blocking of incoming data packets, includes a plurality of ports. Each port is configured to compare a corresponding incoming data packet with at least one template. Each template has min terms specifying a corresponding prescribed value that is to be compared with a corresponding selected byte of the incoming data packet by the port. The network switch also includes a manager module configured to supply a next location field to the corresponding port. The corresponding port determines a next corresponding selected byte of the incoming data packet from the next location field for a next comparison with a next corresponding prescribed value in response to a next location field request. As a result, a port may jump directly to the next relevant byte location after finishing a current evaluation of a current byte location in a received data packet, bypassing non-relevant bytes preceding the next relevant byte.

21 Claims, 7 Drawing Sheets

| | 98a | 98b | 98c | 98d | |
|---|---|---|---|---|---|
| 0 | | Null | xxxx | TO=1 | |
| 1 | | FROM=0 | 2 | TO=2 | 100 |
| 2 | | FROM=1 | 5 | END | |

⋮

| | | | | | |
|---|---|---|---|---|---|
| 0 | | Null | xxxx | TO=3 | |
| 1 | | FROM=3 | 2 | TO=2 | 102 |
| 2 | | FROM=1 | 5 | END | |
| 3 | | FROM=0 | 1 | TO=1 | |

⋮

| | | | | | |
|---|---|---|---|---|---|
| 0 | | Null | xxxx | TO=3 | |
| 1 | | FROM=3 | 2 | TO=4 | |
| 2 | | FROM=4 | 5 | END | 104 |
| 3 | | FROM=0 | 1 | TO=1 | |
| 4 | | FROM=1 | 3 | TO=2 | |

⋮

| | | | | | |
|---|---|---|---|---|---|
| 0 | | Null | xxxx | TO=3 | |
| 1 | | FROM=3 | 2 | TO=2 | |
| 2 | | FROM=1 | 5 | END | 106 |
| 3 | | FROM=0 | 1 | TO=1 | |
| 4 | 1 | FROM=xx | 3 | TO=xx | |

FIG. 5

APPARATUS AND METHOD FOR SPECIFYING SUCCESSIVE BYTE LOCATIONS FOR EVALUATING DATA PACKETS IN A NETWORK SWITCH PORT

BACKGROUND OF THE INVENTION

1. Field of the Invention

The present invention relates to layer 2 (and above) switching of data packets in a non-blocking network switch configured for switching data packets between subnetworks and more particularly to optimizing evaluation of a received data packet for switching.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 and above switching capabilities for faster speed networks such as 100 Mbps or gigabit networks.

However, such design requirements risk loss of the non-blocking features of the network switch, as it becomes increasingly difficult for the switching fabric of a network switch to be able to perform layer 3 processing at the wire rates (i.e., the network data rate).

SUMMARY OF THE INVENTION

There is a need for an arrangement that enables a network switch to provide layer 2 switching and layer 3 switching capabilities for 100 Mbps and gigabit links without blocking of the data packets.

There is also a need for an arrangement that minimizes required memory space in a network switch port by optimizing the storage of min terms for evaluation of the most relevant data bytes of the received data packets.

There is also a need for an arrangement that minimizes the time required in the evaluation of received data packets by the respective ports of a network switch.

These and other needs are attained by the present invention, where a network switch includes a plurality of ports. Each port is configured to compare a corresponding incoming data packet with at least one template. Each template has min terms where each min term specifies a corresponding prescribed value that is to be compared with a corresponding selected byte of the incoming data packet. The network switch also includes a manager module configured to supply a next location field to each port based on a request from the corresponding port. The port determines the next corresponding selected byte of the incoming data packet from the next location field. The next corresponding selected byte is compared with a next corresponding prescribed value in response to a subsequent location field request from the port. As a result, a port may jump directly to the next relevant byte location after finishing a current evaluation of a current byte location in a received data packet, bypassing non-relevant bytes preceding the next relevant byte. Hence, the total time in evaluating a received data packet for switching can be minimized.

One aspect of the present invention provides for a network switch comprising a plurality of ports. Each port is configured to compare a corresponding incoming data packet with at least one template. Each template has min terms specifying a corresponding prescribed value that is to be compared with a corresponding selected byte of the incoming data packet by the port, the selected byte specified by a first location field. The network switch also includes a manager module configured for supplying the first location field and a first address in response to a first request from the corresponding port. The manager module supplies, in response to a second request including the first address from the corresponding port, a second location field specifying a second corresponding selected byte for comparison with a corresponding successive second of the min terms and a second address, the second address specifying a location for a subsequent min term comparison. As a result, a port may begin evaluation of the next relevant byte location after finishing a current evaluation of a current byte location in a received data packet, and thus, reducing the total time in evaluating entire received data packet for switching. Accordingly, a network switch may provide layer 2 switching and layer 3 switching capabilities for 100 Mbps and gigabit links without blocking of the data packets.

Another aspect of the present invention provides a method, in a network switch, of evaluating incoming data packets at a network switch port. The method includes comparing the incoming data packet with at least one template. Each template has min terms where each min term specifying a corresponding prescribed value for comparison by the network switch port with a corresponding selected byte of the incoming data byte, the selected byte specified by a location field. The method also includes requesting a next byte location to determine a next corresponding selected byte for a next comparison with a next corresponding prescribed value with a next location field request from the network switch port. The method further includes supplying the next byte location from a manager module in response to the next location field request from the network switch port.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein:

FIG. 5 is block diagram illustrating the storage of location fields in the link memory of FIG. 3.

BEST MODE FOR CARRYING OUT THE INVENTION

Figure 1:
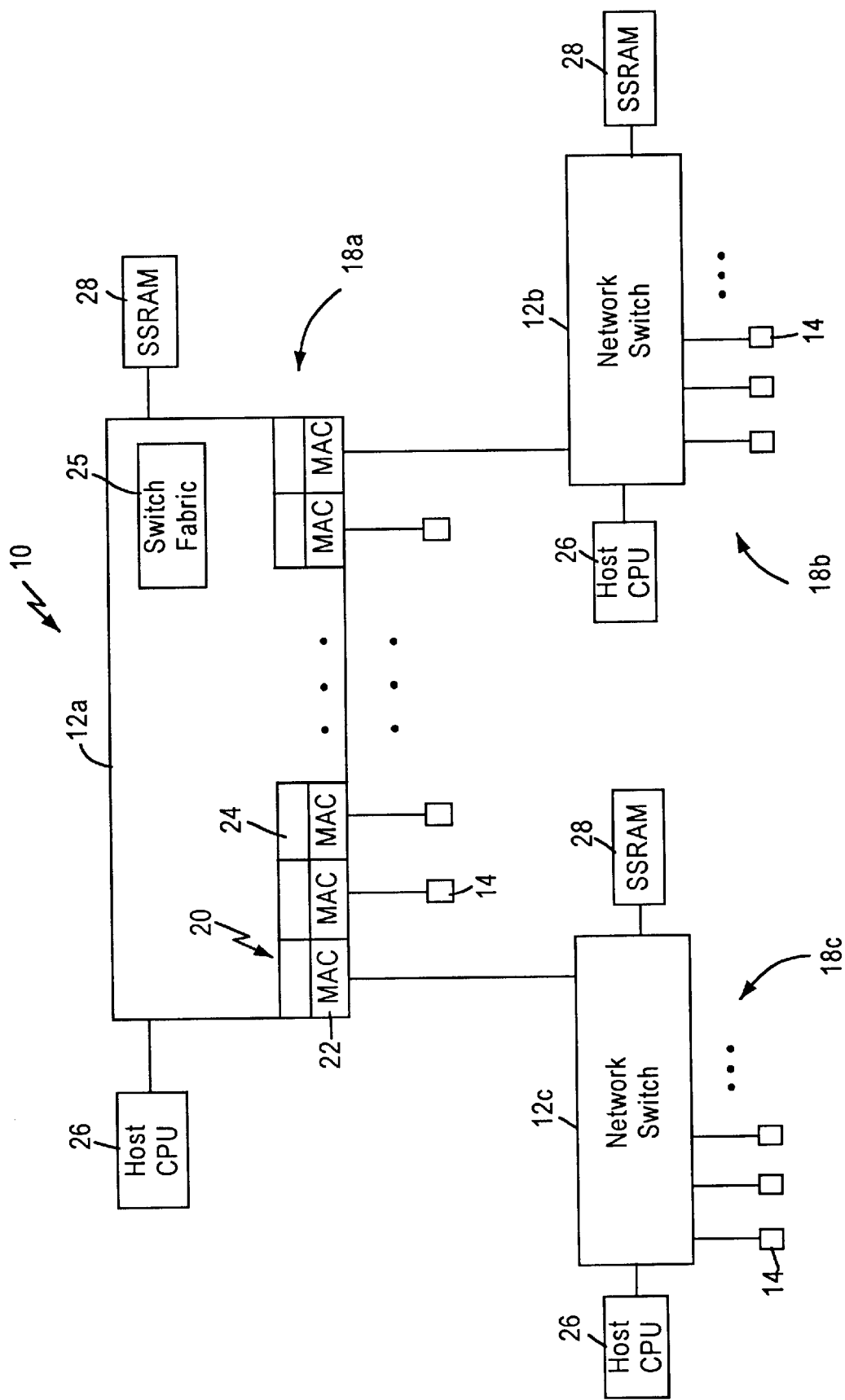
FIG. 1 is a block diagram of a packet switched network including multiple network switches for switching data packets between respective subnetworks according to an embodiment of the present invention.

FIG. 1 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks 18a, 18b, and 18c. Hence, each subnetwork includes a switch 12, and an associated group of network stations 14.

Each switch 12 includes a switch port 20 that includes a media access control (MAC) module 22 and a packet classifier module 24. The MAC module 20 transmits and receives data packets to the associated network stations 14 across 10/100 Mbps physical layer (PHY) transceivers (not shown) according to IEEE 802.3u protocol. Each switch 12 also includes a switch fabric 25 configured for making frame forwarding decisions for received data packets. In particular, the switch fabric 25 is configured for layer 2 switching decisions based on source address, destination address, and VLAN information within the Ethernet (IEEE 802.3) header; the switch fabric 25 is also configured for selective layer 3 switching decisions based on evaluation of an IP data packet within the Ethernet packet.

As shown in FIG. 1, each switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets.

As described above, the switch fabric 25 is configured for performing layer 2 switching decisions and layer 3 switching decisions. The availability of layer 3 switching decisions may be particularly effective if an end station 14 within subnetwork 18a wishes to send an e-mail message to selected network stations in subnetwork 18b, 18c, or both; if only layer 2 switching decisions were available, the switch fabric 25 of switch 12a would need to send the e-mail message to a router (not shown), which would introduce additional delay. Use of layer 3 switching decisions by the switch fabric 25 enables the switch fabric 25 to make intelligent decisions as far as how to handle a packet, including advanced forwarding decisions, and whether a packet should be considered a high-priority packet for latency-sensitive applications, such as video or voice. Use of layer 3 switching decisions by the switch fabric 25 also enables the host CPU 26 of switch 12a to remotely program another switch, for example switch 12b, by sending a message having an IP address corresponding to the IP address of the switch 12b; the switch 12b, in response to detecting a message addressed to the switch 12b, can forward the message to the corresponding host CPU 26 for programming of the switch 12b.

Figure 2:
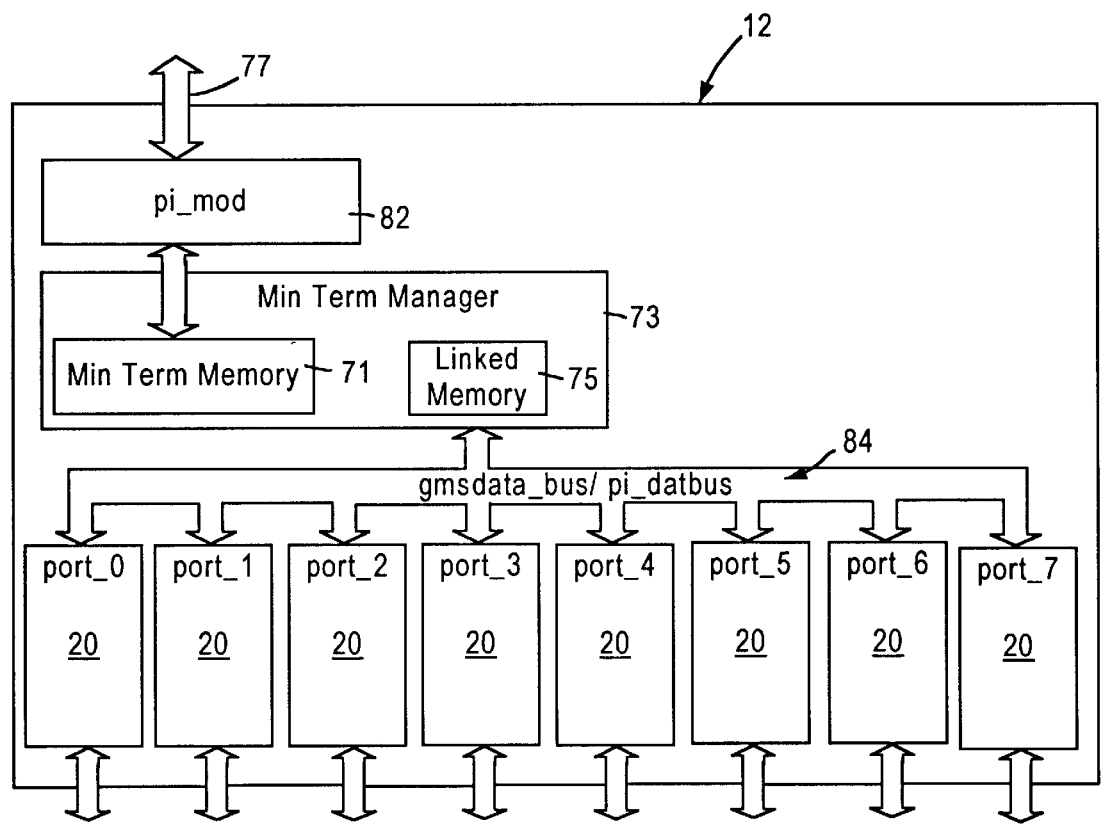
FIG. 2 is a block diagram illustrating a plurality of network switch ports in communication with a min term manager according to an embodiment of the present invention.

FIG. 2 is a block diagram showing a plurality of network switch ports 20 in communication a manager module 73, also referred to as a min term manager. In the illustrated embodiment, eight network switch ports 20 are shown which communicate with the min term manager 73 via data bus 84. The min term manager 73 includes a min term memory (MRAM module) 71 which stores all min terms to be received by the ports 20. The min term manager 73 also includes a link memory 75 which stores a linked list identifying the relevant data bytes (by byte location relative to the start of the IP frame) that are to be compared by the min terms stored in min term memory 71 as will be explained more fully below. The min term manager 73 is loaded with the min terms by a CPU 26 via CPU interface 77 and a processor interface module 82.

According to the disclosed embodiment, the packet classifier module 24 of FIG. 1 is configured for multiple simultaneous comparisons between the incoming data stream and templates that identify the data format of the incoming data stream. Specifically, users of the host processor 26 will specify policies that define how data packets having certain IP protocols should be handled by the switch fabric 25. These policies are implemented by loading into the switch fabric 25 a set of frame forwarding decisions for each corresponding IP protocol type. Hence, the switch fabric 25 could include one set of frame forwarding instructions for an HTTP packet, another set of frame forwarding instructions for an SNMP packet, and another set of frame forwarding instructions for a high-priority packet (e.g., video, or voice, etc.).

Figure 3:
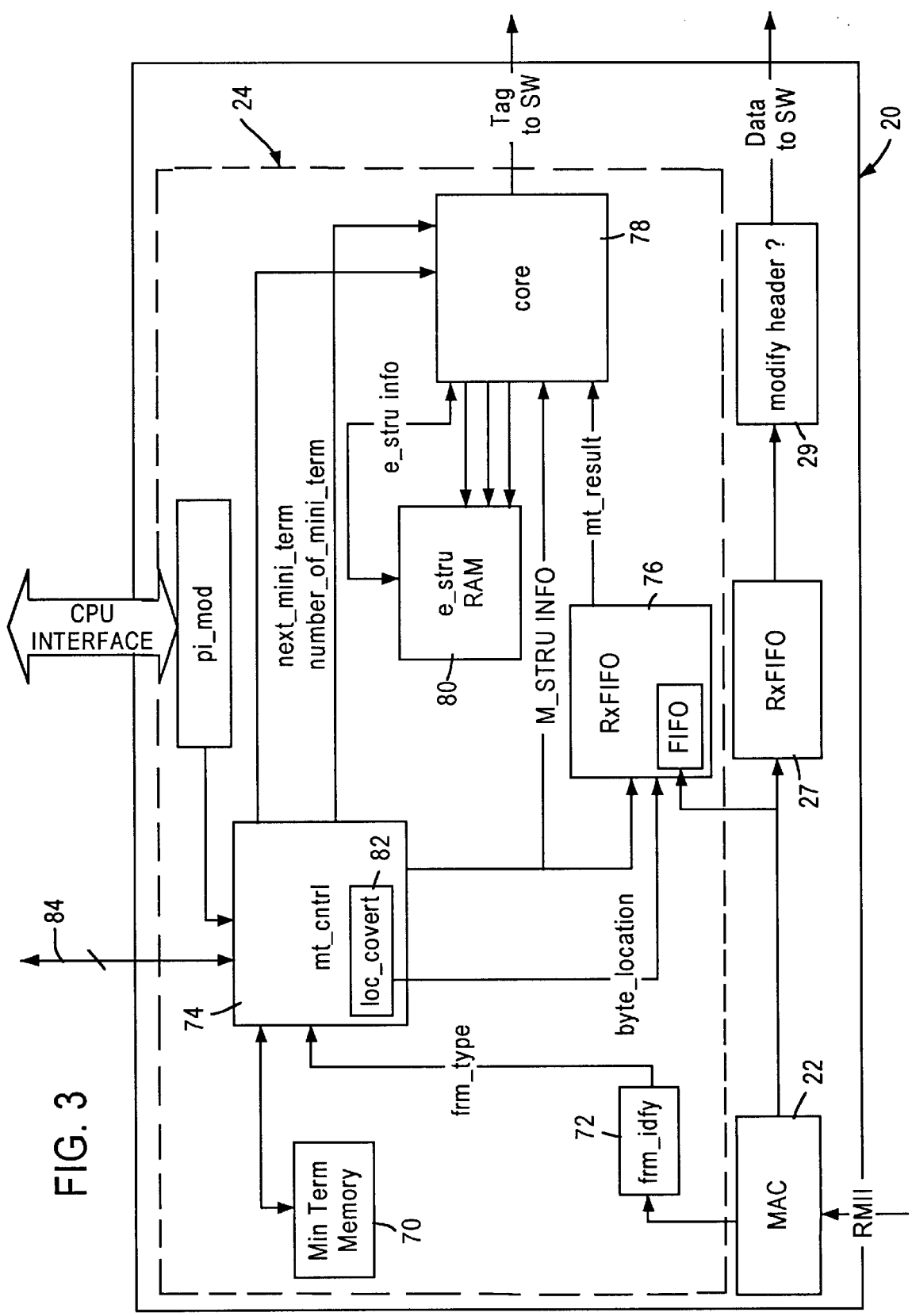
FIG. 3 is a more detailed block diagram illustrating a network switch port of FIG. 2 in communication with a min term manager, according to an embodiment of the present invention.

FIG. 3 is a block diagram illustrating a packet classifier module 24 of a network switch port 20, shown associated with a min term manager 73 in accordance with the invention. As shown, the network switch port 20 includes a MAC 22, a receive FIFO buffer 27, a header modifier 29, and the packet classifier module 24. The packet classifier module 24, also referred to as a network switch port filter, is configured for identifying (i.e., evaluating) the incoming data packet at the network switch port 20, and supplying to the switch fabric 25 a tag that specifies the action to be performed on the data packet based on type of data packet being received.

Specifically, the packet classifier module 24 simultaneously compares the incoming data packet with a plurality of templates configured for identifying respective data formats. The packet classifier module 24, based on the comparison between the incoming data packet and the plurality of templates, identifies an equation to be executed that specifies the tag to be supplied to the switch fabric 25.

Specifically, the packet classifier module 24 generates a comparison result that identifies the incoming data packet by detecting at least one matched template from a plurality of templates. The packet classifier module 24 then identifies which of the equations includes the matched template, and generates the tag specified by the equation.

As shown in FIG. 3, the packet classifier 24, also referred to as a network switch port filter, includes a local min term memory 70. The local min term memory 70 stores the min term values (e.g., M1, M2, etc.,) retrieved from the min term memory 71 of the min term manager 73 for comparison with the incoming data packet. The packet classifier 24 also includes a frame identifier 72 configured for identifying the type of layer 2 information being received. In particular, identifying the type of layer 2 information being received (e.g., Ethernet, IEEE 802 to 3, etc.) enables identification of the start position 64 of the IP packet 32 within the layer 2 packet 30. The packet classifier 24 also includes a min term controller 74, a min term generator 76, an equation core 78, and an evaluation results memory 80.

The min term controller 74 is configured for fetching the stored min terms from the min term memory 71, of the min term manager 73, corresponding to a selected byte of the IP frame 32. Since all min terms are stored in the central min term memory 71, the local min term memory 70 of each network switch port 20 needs to store only min terms used for comparing the next few selected bytes of the incoming data packet, reducing the size of the local memory 70. For example, the local min term memory 70 can be configured to store sixty-four min term entries while the central min term memory 71 can be configured to store about two thousand min term entries.

The min term controller 74 also includes a location converter 82 configured for specifying the actual byte location (byte_location) of the start point 64 in response to receiving a frame type (frm_type) signal from the frame identifier 72 that specifies the type of layer 2 information.

Figure 4:
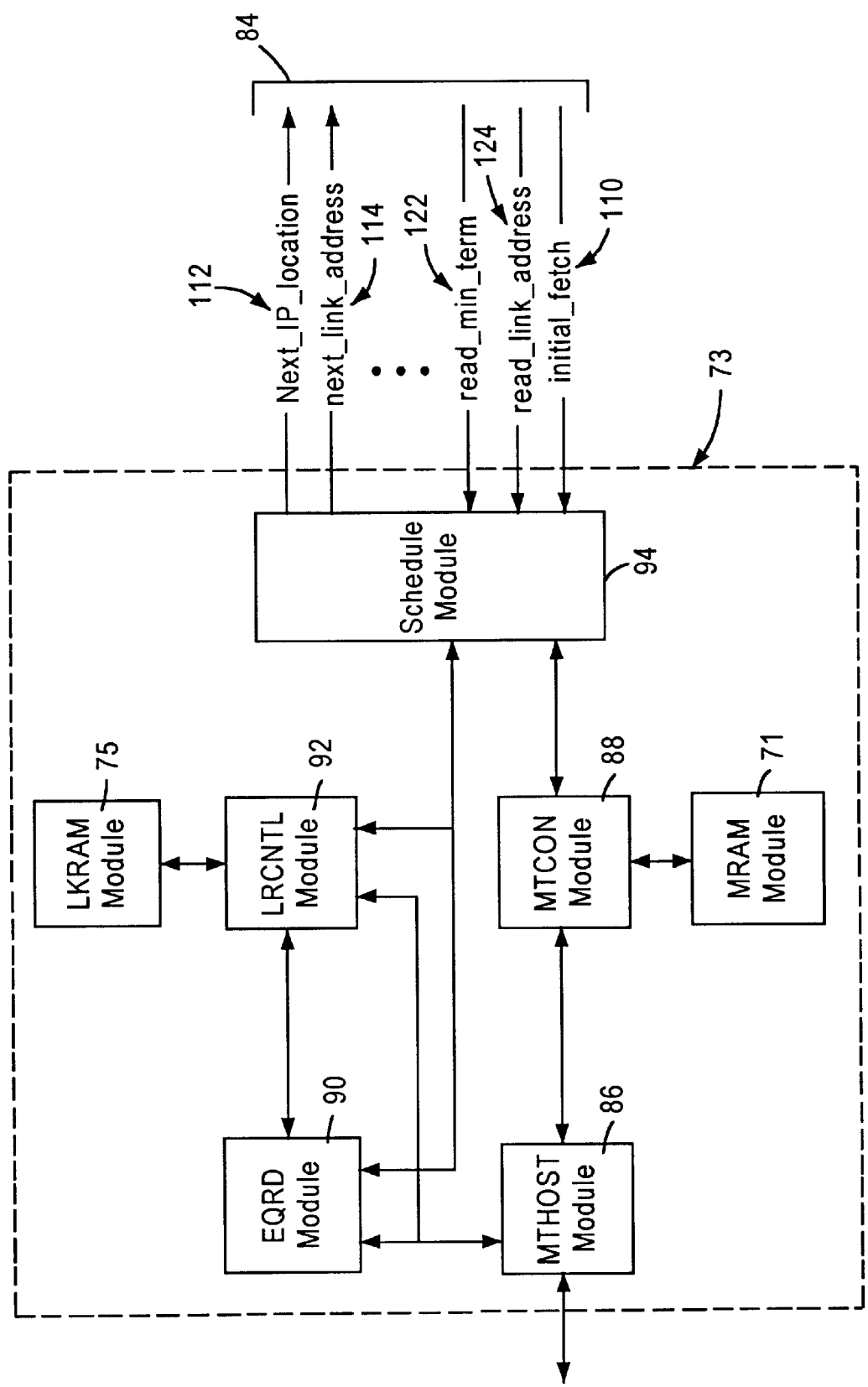
FIG. 4 is a more detailed block diagram illustrating the min term manager of FIG. 2.

FIG. 4 is a block diagram illustrating the min term manager 73. As shown, the min term manager module 73 includes the min term memory 71, the link memory 75, a min term host module 86, a min term controller module 88, an equation module 90, a link memory controller 92 and a schedule module 94.

The min term host module 86 is configured for controlling the reading and writing between the host CPU 26 and the manager module 73. User specified policies are written to and read from the manager module through the processor interface module 82.

The min term controller module 88 is configured for controlling the writing of min terms received from the min term host module 86 into the min term memory 71. The min term controller module 88 is also configured for reading min terms from the min term memory 71 from either the host or the plurality of network switch ports 20.

The equation module 90 is configured for storing header information from the min term host module 86. Each min term structure includes header information which is stored in the equation module 90.

The schedule module 94 is configured for interfacing with the plurality of network switch ports 20 via the interface 84.

The schedule module 94 handshakes with each network switch port with a variety of signals that is not limited to an initial fetch signal, a read link address signal, a read min term signal, a next link address signal, and a next IP location signal.

The link memory controller 92 is configured for controlling the link memory 75. The link memory controller 92 is further configured for storing the corresponding byte locations of the min terms from said min term host module 86 as a linked list in the link memory 75, and for retrieving the corresponding byte locations in response to a request from one of the network switch ports.

The link memory controller 92 is configured to store each corresponding byte location or IP location as an entry in a linked list in the link memory 75. As shown in FIG. 5, each entry is divided into four fields: a valid-field 98a, a previous-field 98b, a location-field 98c, and a destination-field 98d. The link memory controller 92 sets the valid-field 98a to indicate that the corresponding entry is either valid or invalid. The previous-field 98b specifies the previous entry that contains the previous relevant byte location in the linked list. The location-field 98c specifies the byte location of the incoming data packet to be compared with the corresponding min term. The destination field 98d represents for each respective entry, the next entry that contains the next relevant byte location in the linked list.

An example of the linked list stored in link memory 75 is illustrated in FIG. 5. In this example, four min terms are to be stored into the link memory 75. Entry 1 specifies that the first min term is to be compared with a second byte location (specified by the location field 98c) of an incoming packet. Entry 2 specifies that the second min term is to be compared with a fifth byte location (specified by the location field 98c) of an incoming packet. Entry 3 specifies that the third min term is to be compared with a first byte location (specified by the location field 98c) of an incoming packet. Finally, entry 4 specifies that the fourth min term is to be compared with a third byte location (specified by the location field 98c) of the incoming data packet.

Figure 6:
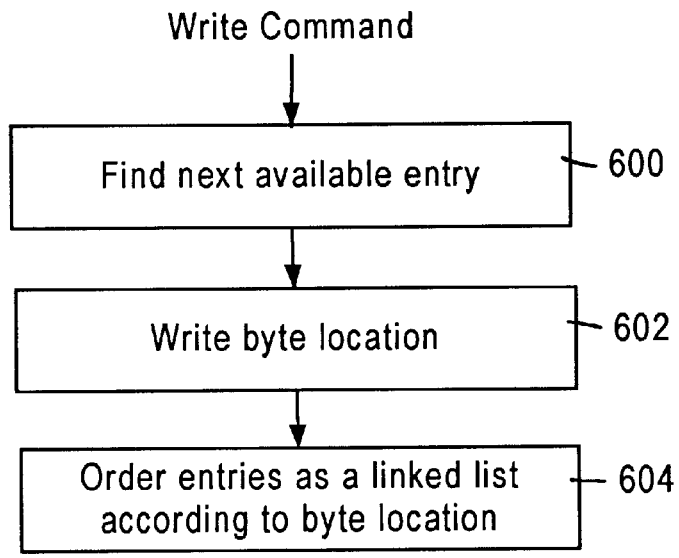
FIG. 6 is a flow diagram illustrating a write command implemented by the link memory controller shown in FIG. 3.

FIG. 6 illustrates a write command by the link memory controller 92. In step 600, the link memory controller 92 searches for the next available entry in the link memory 75 to store the corresponding byte location of the min term.

The link memory controller 92 writes the corresponding byte location in the location-field 98c of the next available entry, in step 602.

Subsequently, in step 604, the link memory controller 92 forms a linked list from the entries in the link memory based on the byte location stored in the location fields 98c. For example, as shown in FIG. 5, sequence 100, the byte locations of the first two min terms are stored in entry 1 and entry 2, respectively, of the link memory 75. The linked list is defined by the fields of 98b and 98d. For example, entry 0 defines the default starting point of the linked list, and the destination-field 98d by indicating entry 1 points to entry 1. The previous-field 98b of entry 1 points to entry 0 and the destination field 98d of entry 1 indicates it is the end of the linked list.

However, when the third byte location is written into the linked memory 75 in sequence 102, the link memory controller 92 writes the byte location of the third min term into the next available entry, entry 3, of the link memory 75. Then, the link memory controller 92, following step 604 of the write command, forms a new linked list based on the byte locations of the filled entries. The link memory controller 92 determines that entry 3 of sequence 102 contains the lowest starting byte location and writes entry 3 into the destination field 98*d* of entry 0 to indicate the next element in the linked list. The link memory controller 92 also writes entry 0 into the previous-field 98*b* of entry 3 to indicate the previous element in the linked list.

The link memory controller 92 determines, in step 660, the next relevant byte location from the rest of the remaining entries. In sequence 102 of FIG. 5, the next relevant byte is entry 1. As such, the link memory controller 92 writes entry 1 into the destination field 98*d* of entry 3 and writes entry 3 in the previous-field 98*b* of entry 1.

Subsequently, the link memory controller 92 determines the subsequent next relevant byte location from the remaining entries, which in this case, is entry 2 having byte location 5. The link memory controller 92 then writes entry 2 into the destination field 98*d* of entry 1 to indicate the next element in the linked list, and writes entry 1 into the previous-field 98*b* of entry 2 to indicate the previous element in the linked list. Since, entry 2 is the last of the remaining entries, the link memory controller 92 writes an END into the destination-field 98*d* of entry 2 to indicate the end of the linked list. For additional terms, this process is repeated in sequence 104, as shown in FIG. 5.

Figure 7:
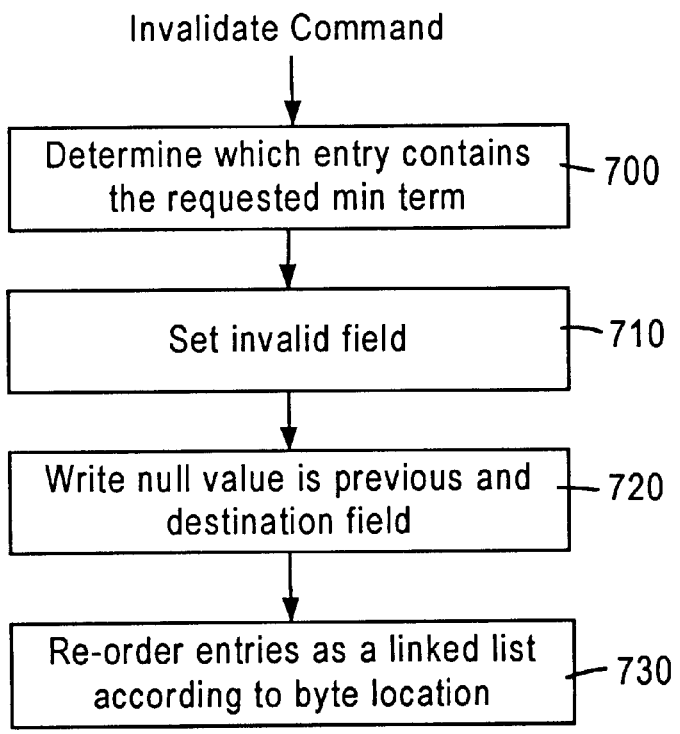
FIG. 7 is a flow diagram illustrating an invalidate command implemented by the link memory controller shown in FIG. 3.

On occasion, the link memory controller 92 will invalidate an entry in the linked list in response to a user command. FIG. 7 illustrates an invalidate command by the link memory controller 92.

As shown in FIG. 7, when the link memory controller 92 receives a request to invalidate a particular min term, the link memory controller 92 searches the linked list to determine which entry contains the byte location, in step 700.

Once the entry has been determined from step 700, the link memory controller 92 sets the invalid field of the entry, in step 710.

Then, in step 720, a null value is written into the previous-field 98*b* and the destination-field 98*d* of the entry, which effectively removes an entry from the linked list.

In step 730, the link memory controller 92 reorders the remaining entries into a linked list based on byte location as previously described above.

As an example, FIG. 5 shows min term being invalidated in sequence 106. The user indicates that the fourth min term is to be invalidated. The link memory controller 92 searches the linked list and determines that entry 4 containing byte location 3 is to be invalidated. The link memory controller 92 sets the invalid-field 98*a* in the link memory. The link memory controller 92 also writes a null value into the previous-field 98*b* and the destination field 98*d* of entry 4. Finally, the link memory controller 92 writes entry 2 into the destination field 98*d* of entry 1 which previously had pointed to entry 4, and writes entry 1 into the previous-field 98*b* of entry 2 which previously had pointed to entry 4. Thus, entry 4 has been effectively removed from the linked list.

Once the linked list has been formed in the link memory 75, the min term manager module 73 may use the linked list to effectively reduce the comparison time in the network switch ports by bypassing non-relevant bytes preceding the next relevant byte.

Figure 8:
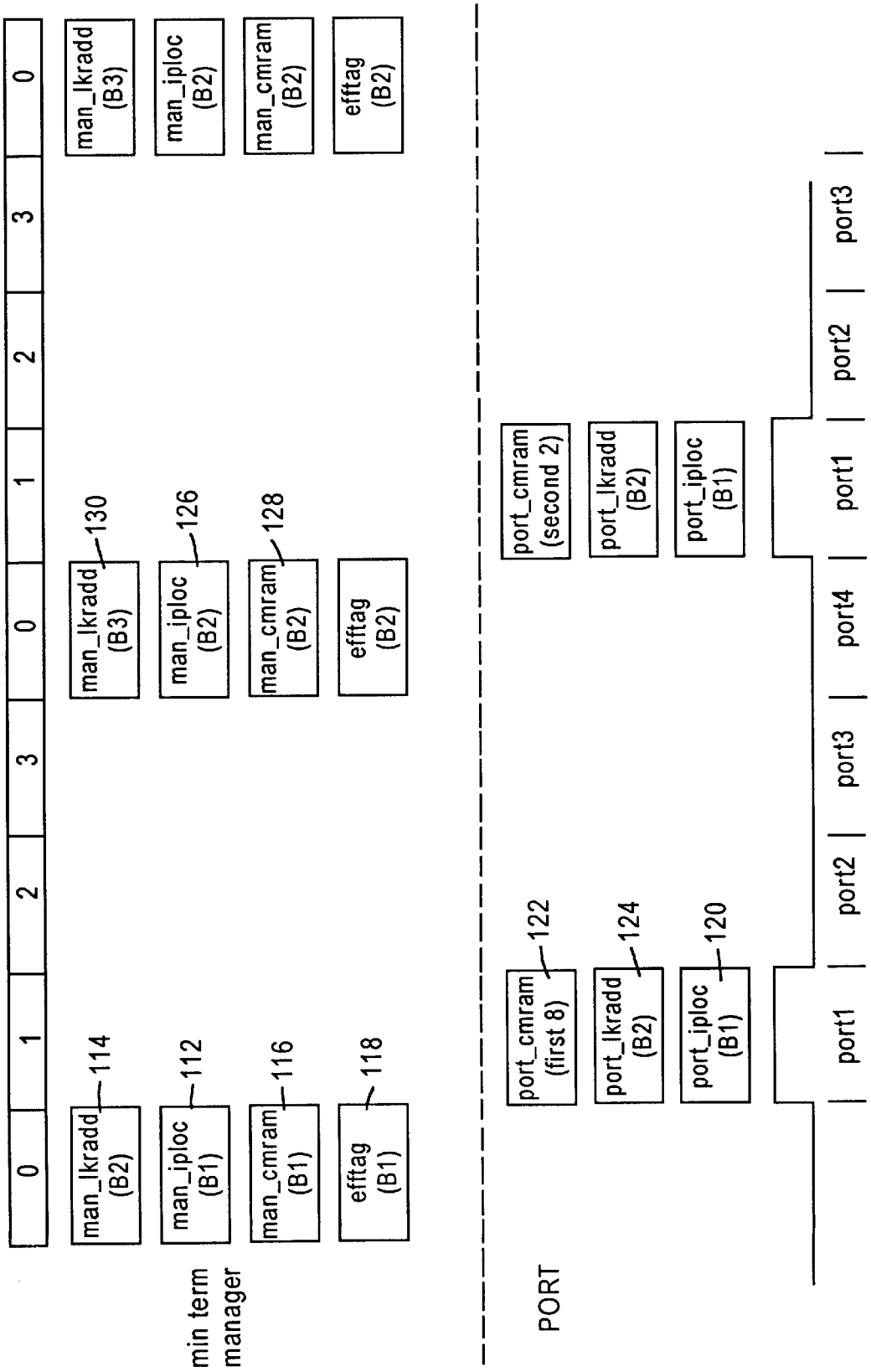
FIG. 8 is block diagram illustrating an exchange of min terms between the min term manager and a network switch port of FIG. 2.

FIG. 8 is block diagram illustrating an exchange of min terms between the min term manager and a network switch port of FIG. 2.

When the data packet is received by a network switch port 20, the corresponding min term controller 74 sends an initial fetch request (not shown) to the min term manager 73. The min term manager 73 in response outputs to the port 20, during time slot 0, a next IP location (man-iploc) 112 of the first relevant byte (e.g., B1) needed to be analyzed in the template, a base address (man-cmram) 116 of the min terms for the first relevant byte (B1) in the MRAM module 71, and a number (efftag) 118 of min terms associated with the first relevant byte (B1), and the address 114 of the next IP location (man-lkradd) of the next relevant byte (e.g., B2, via link memory 75).

The min term controller 74 in response outputs a request during time slot 1 to the min term manager 73 for the relevant min terms by supplying the location (port-iploc) 120 of the corresponding relevant byte (B1), and the address (port-cmram) 122 of the min terms for the corresponding relevant byte (B1). The min term controller 74 also requests the identity of the next relevant byte by supplying the address location (port-lkraddr) 124 of the next relevant byte (B2).

In response to the request from the min term controller 74, the min term manager 73 outputs, during the next time slot 0, at least the subsequent next IP location 126 of the next relevant byte (e.g.,B2), the base address 128 of the min terms for the next relevant byte (e.g., B2) in the MRAM module 71, and the address 130 of the subsequent next IP location of the subsequent next relevant byte (e.g., B3), and the min term structure data of the requested byte location (e.g., B1). In the event that two relevant byte locations, e.g., B1 and B2, were located some distance apart, by returning the address of the next relevant byte from the current relevant byte, the network switch port may bypass the non-relevant bytes in between the current and next relevant bytes. Accordingly, the network switch port saves time in determining which min term to request from the min term manager 73 by examining the efftag 118 and also reduces the width of the ms_data bus which leads to a reduction in cost.

As the network switch port 20 continues to request the identity of the next relevant byte by supplying the address location of the next relevant byte, the min term manager 73 responds with the next relevant byte or next IP location and the address of the subsequent next relevant byte in the link memory 75 until the linked list is traversed.

According to the disclosed embodiment, a network switch includes a min term manager to provide a plurality of network switch ports a next IP location and an address of the subsequent next IP location. With the next IP location and the address of the subsequent next IP location, the network switch ports retrieve the relevant min terms in a minimum amount of time for comparison with a received data packet. Thus, minimizing the time required in the evaluation of received data packets by the respective ports of a network switch and avoiding blocking in the network switch. Moreover, since the network switch ports may retrieve the min terms at the appropriate time, this optimizes the storage of min terms for evaluation of the most relevant data bytes of the received data packets.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A network switch comprising:
   a plurality of ports, each port configured to compare a corresponding incoming data packet with at least one template, each template having min terms each specifying a corresponding prescribed value for comparison by the port with a corresponding selected byte of said corresponding incoming data byte, the selected byte specified by a location field; and a manager module configured to supply each port a next location field for the corresponding port to determine a next corresponding selected byte of a received data packet for a next comparison with a next corresponding prescribed value in response to a next location field request from the corresponding port.

2. The network switch according to claim 1, wherein said manager module comprises:

a link memory configured to store the corresponding location field for each min term of the said at least one template;

wherein the manager module is further configured to supply a base address of min terms associated with the next location field, a requested min terms of a current location field, and an address, of a subsequent next location field in the link memory, to the corresponding port in response to the next location field request whereby the corresponding port supplies the address in a subsequent next location field request.

3. The network switch according to claim 1, wherein said manager module comprises:

a link memory configured to store the corresponding location field of each min term of the said at least one template;

whereby the manager module retrieves the next location field from the link memory based on an address of the next location field supplied in the next location field request from said corresponding port.

4. The network switch according to claim 1, wherein said manager module further comprises:

a host module configured for receiving said at least one template from a host;

a min term memory configured for storing min terms of said at least one template;

a min term controller configured for transferring min terms of said at least one template from the host module into the min term memory; and a link memory configured to store a corresponding location field of each min term of the said at least one template.

5. The network switch according to claim 4, wherein:

the min term controller retrieves a current corresponding prescribed value from the min term memory in response to a min term request from the corresponding port.

6. The network switch according to claim 5, wherein each port comprises a local memory configured for storing of the current corresponding prescribed value included in each port.

7. The network switch according to claim 1, wherein said manager module further comprises:

a link memory configured to store a corresponding location field of each min term of the said at least one template; and a link memory controller configured to store the corresponding location field of each min term as a linked list in the link memory.

8. The network switch according to claim 7, wherein:

each entry of the linked list includes the corresponding location field, a reference to the next corresponding location field, and a reference to a previous corresponding location field.

9. A network switch comprising:

a plurality of ports, each port configured to compare a corresponding incoming data packet with at least one template, each template having min terms each specifying a corresponding prescribed value for first comparison by the port with a corresponding first selected byte of said corresponding incoming data packet, the selected byte specified by a first location field; and a manager module configured for supplying the first location field and a first address in response to a first request from the corresponding port, the manager module supplying, in response to a second request including the first address from the corresponding port, a second location field specifying a second corresponding selected byte for comparison with a corresponding successive second of the min terms and a second address, the second address specifying a location for a subsequent min term comparison.

10. The network switch according to claim 9, wherein said manager module further comprises:

a link memory configured to store a corresponding location field of each min term of the said at least one template; and a link memory controller configured to store the corresponding location field of each min term as a linked list in the link memory.

11. The network switch according to claim 10, wherein each entry of the linked list includes the corresponding location field, a reference to the next corresponding location field, and a reference to a previous corresponding location field.

12. The network switch according to claim 9, wherein said manager module comprises:

a min term memory configured for storing the min terms of said at least one template; and a min term controller configured for transferring min terms of said at least one template from a host into the min term memory.

13. A method, in a network switch, of evaluating an incoming data packet received at a network switch port, the method comprising:

comparing the incoming data packet with at least one template, each template having min terms each specifying a corresponding prescribed value for comparison by the network switch port with a corresponding selected byte of the incoming data byte, the selected byte specified by a location field;

requesting a next byte location to determine a next corresponding selected byte for a next comparison with a next corresponding prescribed value with a next location field request from the network switch port; and supplying said next byte location from a manager module in response to the next location field request from the network switch port.

14. The method according to claim 13, further comprising:

storing the corresponding location field for each min term of said at least one template in a link memory; and supplying a base address of min terms associated with the next location field, a requested min terms of a current location field, and an address, of a subsequent next location in the link memory, to the network switch port in response to the next location field location from the manager module.

15. The method according to claim 14, further comprising:

supplying the address in a subsequent next location field request to the manager module from the network switch port.

16. The method according to claim 13, further comprising:

storing the corresponding location field for each min term of said at least one template in a link memory; and retrieving the next location field by the manager module from the link memory based on an address of the next location field supplied in the next location field request from the network switch port.

17. The method according to claim 13, further comprising:

receiving said at least one template from a host through a host module;

storing the min terms of said at least one template in a min term memory;

transferring the min terms from the host module into the min term memory; and storing the corresponding location field for each min term of said at least one template in a link memory.

18. The method according to claim 17, further comprising:

retrieving a current corresponding prescribed value by the min term controller from the min term memory in response to a min term request from the network switch port.

19. The method according to claim 18, further comprising:

storing the current corresponding prescribed value in a local memory of the network switch port.

20. The method according to claim 13, further comprising:

storing the corresponding location field for each min term of said at least one template in a link memory; and storing the corresponding location field of each min term as a linked list in the link memory by a link memory controller.

21. The method according to claim 20, wherein each entry of the linked list includes the corresponding location field, a reference to the next corresponding location field, and a reference to a previous corresponding location field.

* * * * *